United States Patent [19]
Eckberg et al.

[11] Patent Number: 5,644,453
[45] Date of Patent: Jul. 1, 1997

[54] TAPE DRIVE ACTUATOR INCLUDING A ONE PIECE INTERNALLY PRE-LOADED LINEAR BEARING

[75] Inventors: Eric Alan Eckberg; Gerald Daniel Malagrino, Jr., both of Rochester; Brian Lee Rappel, Grand Meadow, all of Minn.

[73] Assignee: International Business Machines Corporation, Armonk, N.Y.

[21] Appl. No.: 586,519

[22] Filed: Jan. 16, 1996

Related U.S. Application Data

[63] Continuation-in-part of Ser. No. 489,462, Jun. 7, 1995, and a continuation-in-part of Ser. No. 474,227, Jun. 7, 1995, and a continuation-in-part of Ser. No. 472,829, Jun. 7, 1995.

[51] Int. Cl.$^6$ .................................................. G11B 5/55
[52] U.S. Cl. ................................................... 360/106
[58] Field of Search .................................. 360/106, 109; 369/219, 223, 249, 255

[56] References Cited

U.S. PATENT DOCUMENTS 5,491,684  2/1996  Terashima .................. 369/249

*Primary Examiner*—A. J. Heinz
*Attorney, Agent, or Firm*—Laurence R. Letson

[57] ABSTRACT

A tape drive system is described which incorporates a zero clearance bearing for use on a lead screw positioning system having a structure which inherently flexes or closes onto the external surfaces of the lead screw to cause a precise positioning of the lead screw axis relative to a bearing and a bearing support for the bearing. The bearing contact surfaces of the central passage of the bearing which engage the external surfaces of the lead screw are generally planar in form and thus form line contacts with the external surface of the lead screw. The disclosed tape drive system is enhanced in that the play and loose fitting parts in conventional bearing systems are eliminated, and the subject bearing will act to confine the axis of the lead screw to a fixed position relative to the carriage structure of a high density tape drive or other device utilizing a precision lead screw positioning system.

17 Claims, 3 Drawing Sheets

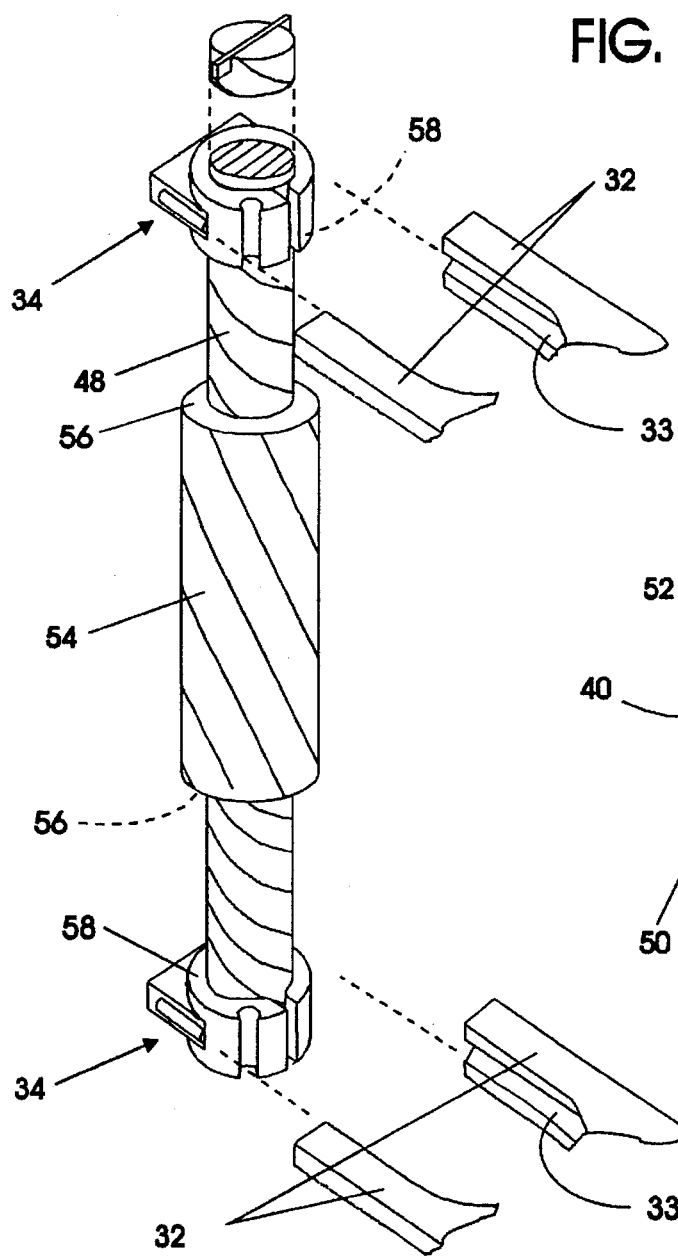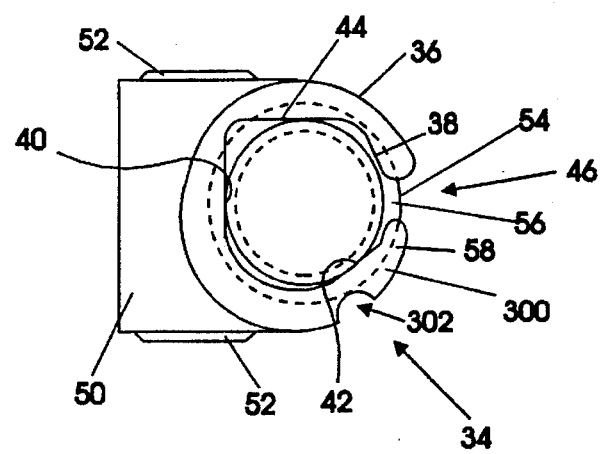

5,644,453

TAPE DRIVE ACTUATOR INCLUDING A ONE PIECE INTERNALLY PRE-LOADED LINEAR BEARING

RELATED APPLICATIONS

This application is a continuation-in-part of: co-pending U.S. patent application, Ser. No., 08/489,462 filed Jun. 7, 1995, and co-pending U.S. patent application Ser. No. 08/474,227 filed Jun. 7, 1995, both filed by Eric A. Eckberg, Brian A. Rappel, and Gerald D. Malagrino, Jr.; and co-pending U.S. patent application, Ser. No. 08/472,829 filed Jun. 7, 1995 by the above named inventors and Thomas D. Weller; which are all incorporated hereinto by reference for purposes of disclosure.

FIELD OF THE INVENTION

This invention relates to bearings for precision devices and more particularly to zero clearance preloaded linear bearings capable of accommodating both radial and thrust loads.

BACKGROUND OF THE INVENTION

In order to precisely move and control the positioning of a carriage within a precision apparatus such as a high data density tape recorder, a lead screw drive may be incorporated into the carriage of an actuator for the tape drive or similar high precision device.

The carriage is positionable by operation of the lead screw drive to displace a magnetic head to the nominal position of a data track on a magnetic tape to be recorded or read. Finer positioning of the magnetic read/write head may be controlled by a voice coil motor (VCM) driving the read/write head in small dynamically controlled positioning moves. The more precise the positioning of the carriage relative to the magnetic tape and the magnetic head relative to the carriage and, thus, relative to the magnetic tape, the less demand is placed on the voice coil motor drive to precisely drive and position the head relative to the track to be recorded or read.

Due to the nature of lead screw drives, the lead screw axis must be confined to a fixed spatial position relative to the carriage and the actuator of the tape drive. Any lack of fixed positioning of the lead screw axis further burdens the VCM and VCM driven components to compensate for the imprecision on a dynamic basis for servo applications as well as degrading head positioning in tape drives without VCM compensation apparatus. The need to position the lead screw axis relative to the carriage is primarily one of consistency inasmuch as the VCM can make compensatory adjustments to ultimately position the magnetic head.

The spacial consistency of the axis location must be addressed in order to maintain a high level of consistency for the magnetic head positions relative to the magnetic tape and its recording tracks. The location of the lead screw axis may be defined and that definition refined by eliminating any play or tolerance clearances which may permit or induce movement of the lead screw relative to the bearing which constrains the lead screw. Bearings designed and built with very tight tolerances and dimensions will result in a zero or at least a low clearance bearing but in the process may very well result in excessive frictional loads and typically are of relatively high cost.

Due to the small size of the drive components in a typical high density data tape drive, it is most desirable to minimize the loading and particularly the frictional loading on the drives that position the head.

The compact design of very high data density tape drives leaves very little room for components; thus, although designed to provide low frictional resistance and precise location of the axis of any lead screw associated therewith, precision linear bearings are typically too large for inclusion into such designs. Additionally, such conventional precision bearings are extremely expensive and accordingly are not practical for inclusion into a mass produced design, such as that found in high density tape drives.

Bearings of sufficiently small size having the necessary precision have been similarly much too expensive and thus not prime candidates for selection as included components.

In tape drives particularly high density data tape drives, the orientation referred to as the azimuth angle between the magnetic head and the magnetic tape is tightly controlled in order to insure the ability to write and then read the data correctly from the magnetic tape. In order to maintain a constant azimuth angle, it is necessary to eliminate any undesirable and unwanted relative movement of the carriage and the magnetic head relative to the magnetic tape.

OBJECTS OF THE INVENTION

It is an object of the invention to provide an improved zero clearance bearing for a lead screw type of drive system.

It is another object of the invention to provide an inexpensive zero clearance bearing for use in a precision lead screw drive.

It is a further object of the invention to provide a molded plastic bearing of the zero clearance type having characteristics that are beneficial for use in small size precision devices.

It is still a further object of the invention to provide an improved tape drive using zero clearance bearings and a lead screw drive approach to position the magnetic head, at least the coarse positioning movements thereof.

SUMMARY OF THE INVENTION

The shortcomings of the prior art are overcome and the objects of the invention accomplished by a linear bearing having a deflectable segment to insure zero clearance and that the bearing surfaces engage the lead screw periphery with minimal surface contact while defining a consistent lead screw axis location. A plastic molded linear bearing having an exterior compatible with the mounting surfaces of a support structure, such as the carriage of the high data density tape drive, is formed with a hollow center passage. A slit or gap is formed into the outer wall connecting the outer surface of the structure and the central passage. Plastic material is selected from materials which have slippery or lubricating qualities to minimize friction with the lead screw and the nut engaged with the lead screw which when driven by the drive motor will butt an end surface of the bearing structure.

The bearing of this invention is formed with a central passage having surfaces to engage the lead screw on the lead screw circumference. The bearing has one portion which is predisposed to flex inward onto the lead screw to confine the lead screw within the bearing. This natural tendency to flex inward or to close creates a zero clearance between the bearing surfaces and the lead screw circumference. In order to take advantage of the zero clearance aspects of the bearing and at the same time reduce friction to a acceptable or tolerable level, the contact between the internal bearing surfaces and the lead screw outer surface is accomplished by forming the engaging surfaces of the bearing in the form of a hollow tube with sides disposed corresponding to sides of a triangular cross-section passage, preferably a right triangle. The sides are formed at least in the areas where contact with the outer surface of the lead screw is expected, in the form of a plane, so that contact between the lead screw exterior surface and the bearing surface is one of a line contact. The other regions of the interior surface of the bearing are relieved from the outer surface of the lead screw and accordingly do not contact the lead screw surface, thus eliminating frictional contact in those areas.

A gap is formed in the wall of the bearing structure which communicates between the central passage and the exterior of the bearing. This gap permits one or both ends of the generally cylindrical structure of the bearing to flex and to be displaced inwardly or outwardly relative to the lead screw disposed within the central passage of the bearing. The flap or side which is capable of being flexed carries on its inner surface one of the planar lead screw engaging surfaces. The flap and planar surface are generally oriented to force the lead screw toward the included angle between the remaining two generally planar sides of the central passage. The two planar sides forming the included angle, preferably a right angle, form the locating surfaces for the circumferential surface of the lead screw and thus define with a high degree of precision the axial location of the lead screw relative to the bearing. The resilience of the third side of the generally triangular-shaped central passage continues to force the lead screw into the above described included angle and maintains the lead screw axis at a fixed spatial location relative to the bearing. With a pair of bearings fixedly attached to a support structure, the axis of the lead screw is reliably maintained in a fixed spatial location relative to the structure providing the bearings supports.

Each bearing is desirably formed with a mounting flange having an exterior which conforms to the structure of the bearing support and preferably is provided with ridges which slip into retaining channels in the bearing supports to resist axial movement of each bearing relative to its bearing supports. The bearing support merely may be inserted in the channels or may be attached to the channels using materials such as epoxy or adhesives, or insert molding.

With the bearing structure inserted in the bearing support channels, the bearing is disposed to accept thrust forces. This is necessary because the lead screw will be at least partially surrounded by a threaded nut engaging the screw on the exterior of the lead screw. Rotation of the threaded nut will cause the nut to translate axially as well as rotationally about the lead screw and progressively move with respect to the lead screw. As the nut is progressively moved in one direction or another, the end of the nut will come into engagement with one of the two bearings engaging the lead screw and thereby exert an axial force against one end face of a bearing, causing the movement of the bearing support structure relative to the lead screw. A better understanding of the zero clearance linear and thrust bearing of the present invention may be derived from the attached drawings and the detailed description of the invention to follow.

BRIEF DESCRIPTION OF THE DRAWINGS

FIG. 3 is a top view of the bearing of the present invention.

FIG. 4 illustrates the bearing on the lead screw with the nut disposed between two adjacent bearings mounted in bearing supports of a carriage.

FIGS. 1 and 2 correspond to FIGS. 1 and 2 of co-pending U.S. patent application Ser. Nos. 08/489,462, 08/474,227 and 08/472,829 identified above.

Figure 1:
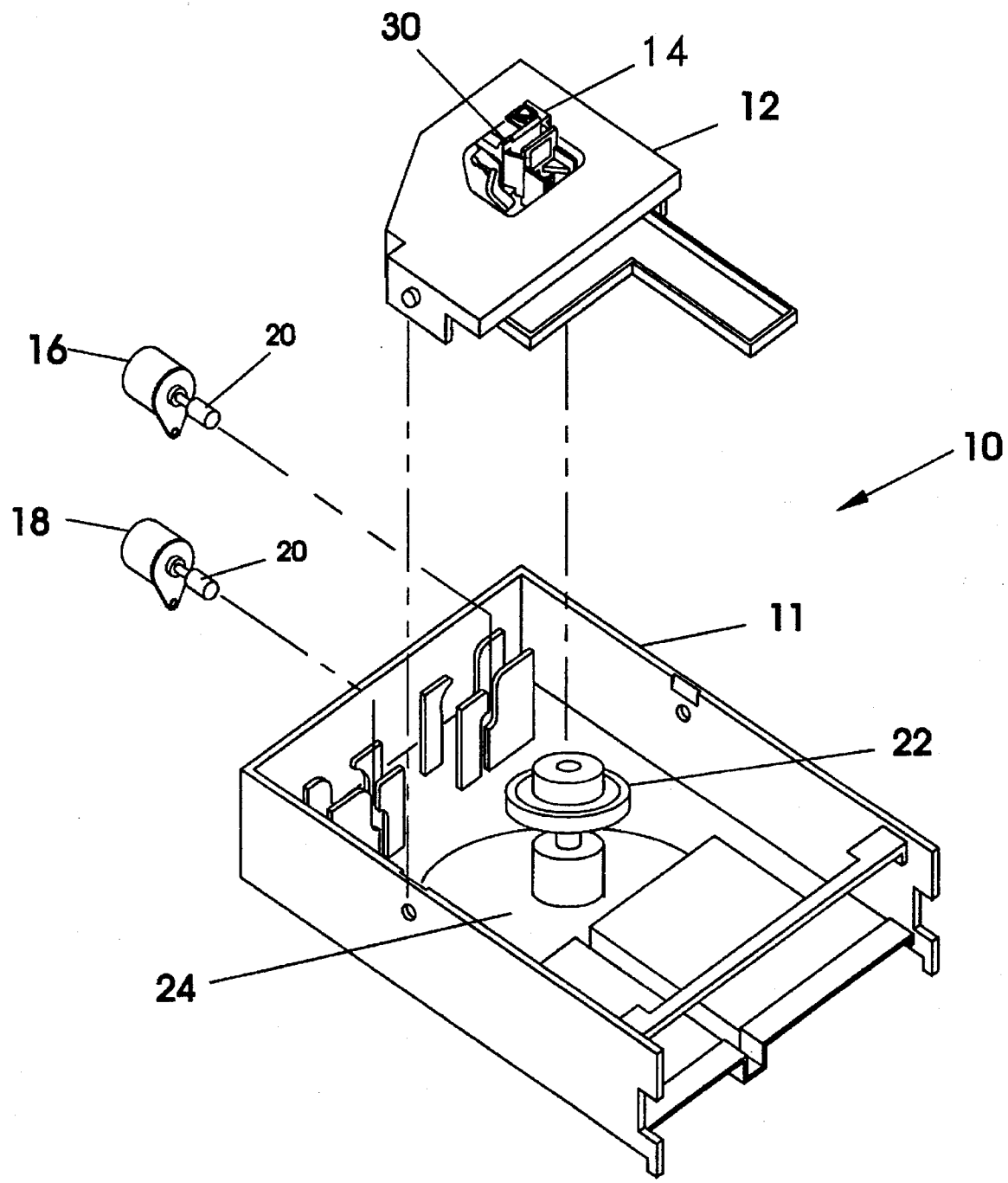
FIG. 1 is a perspective view of a partially disassembled tape drive with the cover removed for visibility.

DETAILED DESCRIPTION OF THE PREFERRED EMBODIMENT OF THE BEST MODE AS CONTEMPLATED

BY THE INVENTORS FOR CARRYING OUT THE INVENTION

The reference numerals in any figure hereof having a reference numeral value of less than 300 corresponds to the like reference numeral in co-pending U.S. patent application Ser. Nos. 08/489,462, 08/474,227, 08/472,829 which have been incorporated by reference hereinto. Reference numerals of 300 or greater are not found in the co-pending applications and are described with respect to FIGS. 1-4 hereof.

Referring initially to FIG. 1, there is illustrated a partial high data density tape drive of the type in which the invention may be advantageously used.

FIG. 1 illustrates tape drive 10 with its cover removed for visibility and with bridge 12 exploded out and removed from the tape drive chassis 11. Bridge 12 supports the magnetic read/write head positioning carriage assembly 14. Read/write head or transducer positioning carriage assembly 14 is illustrated in FIG. 2 as an exploded view and will be addressed in more detail with that figure.

Stepper motors 16 and 18 are supported by chassis 11 of the tape drive 10. Read/write head or transducer positioning stepper motor 16 through gear 20, preferably a worm gear, provides the positioning drive to position the read/write head positioning assembly 14 relative to bridge 12.

Tape drive 10 further is provided with the capstan drive 22 necessary to feed the tape, not shown. Capstan drive 22 comprises a soft rubber wheel or roller to engage the tape of a cartridge for feeding purposes and is driven by capstan motor drive 24.

Figure 2:
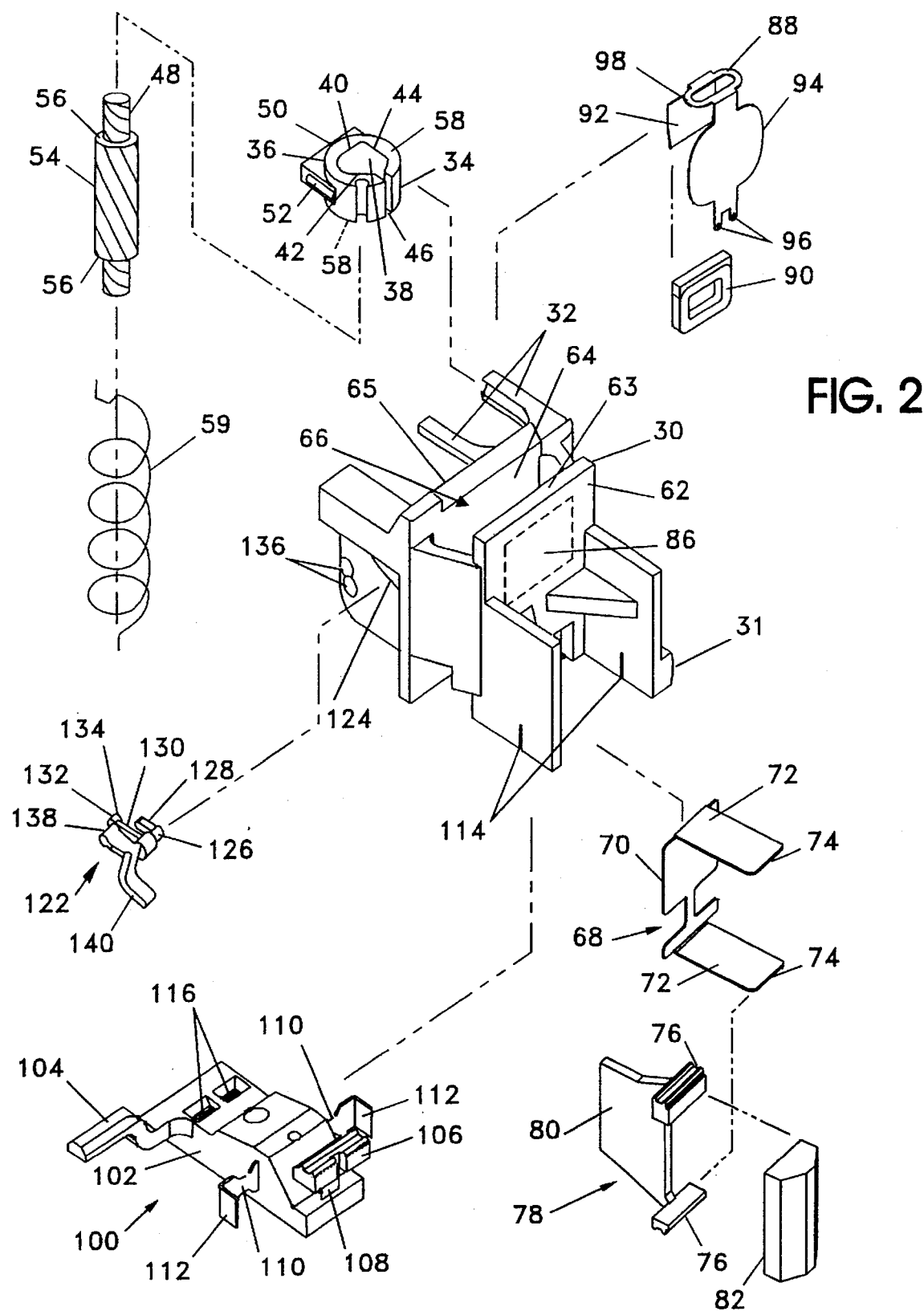
FIG. 2 illustrates the carriage assembly exploded to reveal the characteristics of the various parts thereof.

Referring now to FIG. 2, carriage 30 is illustrated as having a bearing support structure 32. Bearing support structure 32 is comprised of a pair of arms projecting from carriage 30 and which have grooves 33 formed into the facing surfaces thereof to accept bearing 34. Although only one bearing 34 is visible, bearing 34 is duplicated for a substantially identical bearing support structure directly below the one illustrated so that a pair of such bearings 34 will be supported by a pair of such support structures 32.

Typically, bearing 34 is molded of a plastic material and is comprised of a cylindrical form 36 having an interior opening 38. The interior opening 38 is characterized by three planar surfaces 40, 42, and 44. A gap 46 in cylindrical form 36 allows a lead screw 48 to be inserted within the interior opening 38 and makes the bearing 34 a split bearing. In so doing, planar walls 42 and 44 will be slightly spread apart, widening the gap 46. As the cylindrical form 36 attempts to close back to its original state, wall 42 will force the lead screw 48 into a positioning engagement with planar surfaces 40 and 44, thereby insuring accurate placement of the lead screw 48 relative to bearing 34. Bearing 34 is further provided with a partial flange 50 having ribs 52 which will mate with the inner groove 33 of bearing support structure 32. The axial dimension of the linear bearing 34 should be at least sufficient to span a plurality of the lands of the lead screw 48 at all times.

Geared nut 54 is threaded onto lead screw 48; and whenever lead screw 48 is rotationally fixed by mounting lead screw 48 into bridge 12, rotation of geared nut 54 by worm gear 20 on the stepper motor 16 will cause nut 54 to be progressively raised or lowered with respect to lead screw 48. The end surfaces 56 of geared nut 54 may be disposed in abutting relationship to the end surfaces 58 of bearings 34. The force effecting the raising and lowering of the carriage 30 is exerted on the lower bearing 34 due to the influence of the pre-load spring 59 which engages carriage 30 and bridge 12 to bias the carriage 30 upward. Pre-load spring 59 maintains contact between geared nut 54 and lower bearing 34 except when carriage 30 is driven to an end-of-track position such as following activation of the servo- control latch.

Referring to FIG. 3, bearing 34 is illustrated in a top plane view which more clearly illustrates the three planar surfaces 40, 42, 44 which serve to engage the exterior surface of lead screw 48. Lead screw 48 is nested in the included angle between bearing surfaces 40, 44 and is forced into engagement with surfaces 40, 44 by the resilience and the natural tendency of segment 300 of the bearing structure to restore after having been slightly distorted by the insertion of lead screw 48. By forcing lead screw 48 into nesting in the included angle between planar surfaces 40, 44, the axis of rotation of lead screw 48 is consistently and precisely defined. A groove or relief 302 is formed into the exterior of the cylindrical form 36 of the bearing 34 and provides an increased degree of flexure for segment 300 permitting the insertion of lead screw 48 without unduly stressing the material from which the bearing 34 is fabricated. If an inactive preload is required, notch 302 may be filled with an epoxy to inactivate the preload after assembly.

As it is further illustrated in FIG. 3, surface 56 of the threaded nut 54 engages the underside of the cylindrical form 36; and as the nut 54 is rotated to cause nut 54 to rise toward the viewer in FIG. 3, it will tend to force the bearing 34 upward relative to lead screw 48. Conversely, for a bearing 34 of identical structure disposed below the nut 54 as the nut 54 would be rotated to recess away from the viewer in FIG. 3, the bottom end surface 56 of the nut 54 will engage the top surface 58 of the bearing 34 and thus displace the bearing 34 downward. As may be seen more illustratively in FIG. 4 where the bearings 34 engage the bearings support structure 32, shifting of the bearings 34 will cause the shifting of the bearing support structure 32 and any other structure attached thereto relative to the axis of lead screw 48.

It will be recognized that one of skill in the art may make minor verifications and modifications to the disclosed subject matter without removing the subject matter from the scope of the appended claims which define the invention.

We claim:

1. An actuator for positioning a transducer head in a tape drive, comprising:
    a carriage to which said transducer head is secured;
    a lead screw non-rotatably mounted in said tape drive;
    a pair of molded split bearings secured to said carriage and having openings for receiving said lead screw with substantially zero clearance; and
    a threaded nut positioned to engage said lead screw between said pair of molded split bearings to move said carriage along said lead screw as said threaded nut is rotated relative to said lead screw.

2. The actuator of claim 1 wherein each said split bearing comprises a member having a central passage therethrough; an exterior, and a gap in a wall of said member communicating between said central passage and said exterior.

3. An actuator for positioning a transducer head in a tape drive, comprising:
    a carriage to which said transducer head is secured;
    a lead screw fixedly mounted in said tape drive;
    a pair of molded split bearings secured to said carriage and having openings for receiving said lead screw with substantially zero clearance;
    each said split bearing comprising a member having a central passage therethrough, an exterior and a gap in a wall of said member communicating between said central passage and said exterior, and
    a threaded nut positioned to engage said lead screw between said pair of molded split bearings to move said carriage along said lead screw as said threaded nut is rotated relative to said lead screw;
    each said split bearing comprising a plurality of surfaces forming said opening, at least three of said surfaces contacting said lead screw in a line contact.

4. The actuator of claim 3 wherein each said split bearing comprises a plurality of surfaces forming said central passage, at least three of said surfaces contacting said lead screw in a line contact.

5. The actuator of claim 4 wherein two of said three surfaces lie in planes which intersect at substantial perpendicularity and said third surface has a line normal thereto, said line normal to said third surface extending substantially to an apex formed by intersection of said planes in which said two surfaces lie.

6. The actuator of claim 3 wherein each said three surfaces are substantially planar and engage said lead screw exterior.

7. The actuator of claim 6 wherein said bearing further comprises a relief in said exterior of said bearing and diminishes thickness of said bearing.

8. The actuator of claim 7 wherein said relief is disposed on said exterior and proximate said third surface.

9. The actuator of claim 8 further comprising a flange extending from said bearing for mounting said bearing and for transmitting axial thrust forces to said bearing.

10. An actuator for positioning a transducer head in a tape drive, comprising:
    a carriage to which said transducer head is secured;
    a lead screw fixedly mounted in said tape drive;
    a pair of molded split thrust bearings secured to said carriage and having openings for receiving and substantially surrounding said lead screw with substantially zero clearance between said lead screw and said bearings and,
    a rotatable threaded nut surrounding said lead screw between said pair of molded split bearings to move said carriage along said lead screw as said threaded nut is rotated relative to said lead screw.

11. The actuator of claim 10 wherein each said split bearing comprises a member having a central passage therethrough; an exterior, and a gap in a wall of said member communicating between said central passage and said exterior.

12. The actuator of claim 11 wherein each said split bearing comprises a plurality of surfaces forming said central passage, at least three of said surfaces contacting said lead screw in a line contact.

13. The actuator of claim 12 wherein two of said three surfaces lie in planes which intersect at substantial perpendicularity and said third surface has a line normal thereto, said line normal to said third surface extending substantially to an apex formed by intersection of said planes in which said two surfaces lie.

14. The actuator of claim 12 wherein each said three surfaces are substantially planar and engage said lead screw exterior.

15. The actuator of claim 14 wherein said bearing further comprises a relief in said exterior of said bearing and diminishes thickness of said bearing.

16. The actuator of claim 15 wherein said relief is disposed on said exterior and proximate said third surface.

17. The actuator of claim 16 further comprising a flange extending from said bearing for mounting said bearing and for transmitting axial thrust forces to said bearing.

* * * * *